(12) United States Patent
Benco et al.

(10) Patent No.: US 7,248,885 B2
(45) Date of Patent: Jul. 24, 2007

(54) AUTOMATIC/TIMED SILENCING OF MOBILE PHONE FROM A NETWORK

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 412 days.

(21) Appl. No.: 10/435,450

(22) Filed: May 9, 2003

(65) Prior Publication Data

US 2004/0224671 A1 Nov. 11, 2004

(51) Int. Cl.
*H04Q 7/20* (2006.01)
(52) U.S. Cl. .................... 455/461; 455/456.4; 455/528; 455/567
(58) Field of Classification Search ............. 379/207.1, 379/210.02; 455/3.04, 68, 88, 26.1, 417, 455/461, 456.4, 528, 567
See application file for complete search history.

(56) References Cited

U.S. PATENT DOCUMENTS

| | | | | | |
|---|---|---|---|---|---|
| 5,467,388 | A | * | 11/1995 | Redd et al. ............. 379/210.02 |
| 5,933,778 | A | * | 8/1999 | Buhrmann et al. ......... 455/461 |
| 6,044,275 | A | * | 3/2000 | Boltz et al. .................. 455/466 |
| 6,317,593 | B1 | * | 11/2001 | Vossler ..................... 455/414.1 |
| 6,628,194 | B1 | * | 9/2003 | Hellebust et al. ............ 340/7.5 |
| 6,831,970 | B1 | * | 12/2004 | Awada et al. .......... 379/201.01 |
| 6,892,069 | B1 | * | 5/2005 | Flynn ...................... 455/432.1 |
| 6,907,254 | B1 | * | 6/2005 | Westfield .................. 455/456.4 |
| 2001/0006546 | A1 | * | 7/2001 | Jung ......................... 379/56.3 |
| 2001/0009863 | A1 | * | 7/2001 | Kim ........................... 455/567 |
| 2002/0132610 | A1 | * | 9/2002 | Chaplin et al. ............. 455/414 |
| 2002/0168978 | A1 | * | 11/2002 | Molnar et al. ............... 455/433 |
| 2003/0025592 | A1 | * | 2/2003 | Choi et al. ............. 340/309.15 |
| 2003/0125014 | A1 | * | 7/2003 | Inukai et al. ............... 455/410 |
| 2004/0110489 | A1 | * | 6/2004 | Murri et al. ............. 455/412.1 |
| 2004/0203643 | A1 | * | 10/2004 | Bhogal et al. ........... 455/414.1 |

\* cited by examiner

*Primary Examiner*—Fan Tsang
*Assistant Examiner*—Hemant Patel

(57) ABSTRACT

A method and system provides automatic/timed silencing of a mobile phone by a telecommunications network. The method has the steps of: forming a schedule of silence at a mobile phone; sending the schedule of silence to a mobile switching center; storing the schedule of silence in a subscriber database in the mobile switching center; blocking at least incoming calls at the mobile switching center according to the stored schedule of silence, and sending a first message to the mobile phone that instructs the mobile phone to enter a silence mode; transmitting, according to the stored schedule of silence, a second message from the mobile switching center to the mobile phone that instructs the mobile phone to exit the silence mode, and ceasing to block at least the incoming calls to the mobile phone. The system implements the method.

17 Claims, 4 Drawing Sheets

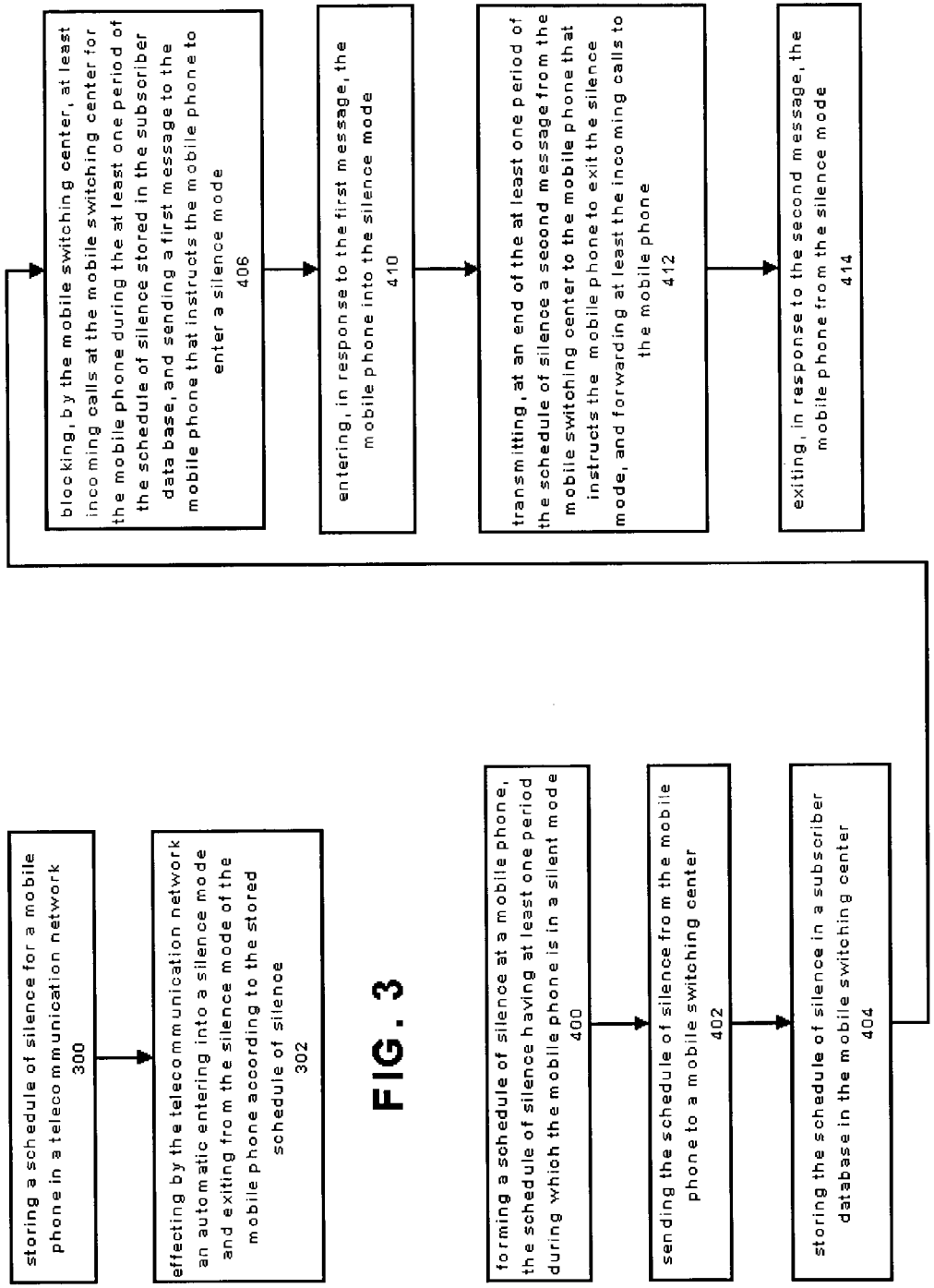

AUTOMATIC/TIMED SILENCING OF MOBILE PHONE FROM A NETWORK

TECHNICAL FIELD

The present invention relates to wireless telephony in general, and, more particularly, to a method and system for providing automatic/timed silencing of a mobile phone from a telecommunications network.

BACKGROUND OF THE INVENTION

Wireless telephones, which include both cellular telephones and the higher frequency personal communication devices (PCDs), are growing in numbers and also shrinking in size and weight. The growth in numbers is influenced by the convenience and the per call cost of wireless telephones with respect to pagers and wire line telephones or coin telephones for completing calls, especially when the user is away from home or office. The shrinking size is influenced by two related technologies: more efficient receive/transmit processing circuits and higher power density batteries.

Telephone service subscribers with mobile phones do not necessarily want to answer all the telephone calls they receive. Many situations prevent a user from even activating a mobile phone, for example when the user is inside a hospital or at a theater performance. Although mobile phones can be set to vibrate, instead of ring, some users do not want to be interrupted during certain times that occur periodically, for example a weekly church service.

Many times a user forgets to turn his phone off or to change it from ring to vibrate. This often results in embarrassment to the user when the phone rings at an inopportune time. Furthermore, the user may forget to turn the mobile phone back on, and may therefore miss an important call. Thus, prior art mobile phones have a significant drawback. There is therefore a need in the art for an improved method and system for providing automatic/timed silencing of a mobile phone by a telecommunications network.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of an embodiment of the present method and system to provide a method and system for, especially on a mobile phone in a telecommunications network, providing automatic/timed silencing of a mobile phone from a telecommunications network.

It is a further aspect of an embodiment of the present method and system to provide for automatic/timed silencing of a mobile phone for a predetermined period of time.

It is a further aspect of an embodiment of the present method and system to provide for blocking incoming calls and/or message alerts during automatic/timed silence periods of a mobile.

It is a further aspect of an embodiment of the present method and system to provide for automatically sending incoming calls and/or message alerts to an associated voice mail system during automatic/timed silence periods of a mobile.

In general terms one embodiment of the present method is for providing automatic/timed silencing of a mobile phone by a telecommunications network. The method has the steps of: forming a schedule of silence at a mobile phone, the schedule of silence having at least one period during which the mobile phone is in a silent mode; sending the schedule of silence from the mobile phone to a mobile switching center; storing the schedule of silence in a subscriber database in the mobile switching center; blocking, by the mobile switching center, at least incoming calls at the mobile switching center for the mobile phone during the at least one period of the schedule of silence stored in the subscriber database, and sending a first message to the mobile phone that instructs the mobile phone to enter a silence mode; entering, in response to the first message, the mobile phone into the silence mode; transmitting, at an end of the at least one period of the schedule of silence a second message from the mobile switching center to the mobile phone that instructs the mobile phone to exit the silence mode, and ceasing to block at least the incoming calls to the mobile phone; and exiting, in response to the second message, the mobile phone from the silence mode.

Also, in general terms one embodiment of the present system is for providing automatic/timed silencing of a mobile phone by a telecommunications network. The system has: a schedule of silence for a mobile phone; a mobile switching center operatively connected to the mobile phone; a subscriber database operatively connected to the mobile switching center and having stored therein the schedule of silence for the mobile; a call blocking module operatively connected to the mobile switching center; and a mobile phone silencing controller operatively connected to the mobile switching center and to the call blocking module. The mobile phone silencing controller automatically enters the mobile phone into a silence mode and exits from the silence mode according to the stored schedule of silence. The call blocking module blocks at least incoming calls for the mobile phone according to the stored schedule of silence.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 3 illustrates a very general flow chart of logical operational steps that may be followed in accordance with one embodiment of the present method and system.

FIG. 4 illustrates another flow chart of logical operational steps that may be followed in accordance with one embodiment of the present method and system.

DETAILED DESCRIPTION

The particular values and configurations discussed in these non-limiting examples can be varied and are cited merely to illustrate an embodiment of the present invention and are not intended to limit the scope of the invention.

The present method provides for automatic/timed silencing of a mobile phone by a telecommunications network. In very general terms the method has the steps of: storing a schedule of silence for a mobile phone in a telecommunication network; and effecting by the telecommunication network an automatic entering into a silence mode and exiting from the silence mode of the mobile phone according to the stored schedule of silence.

Figure 1:
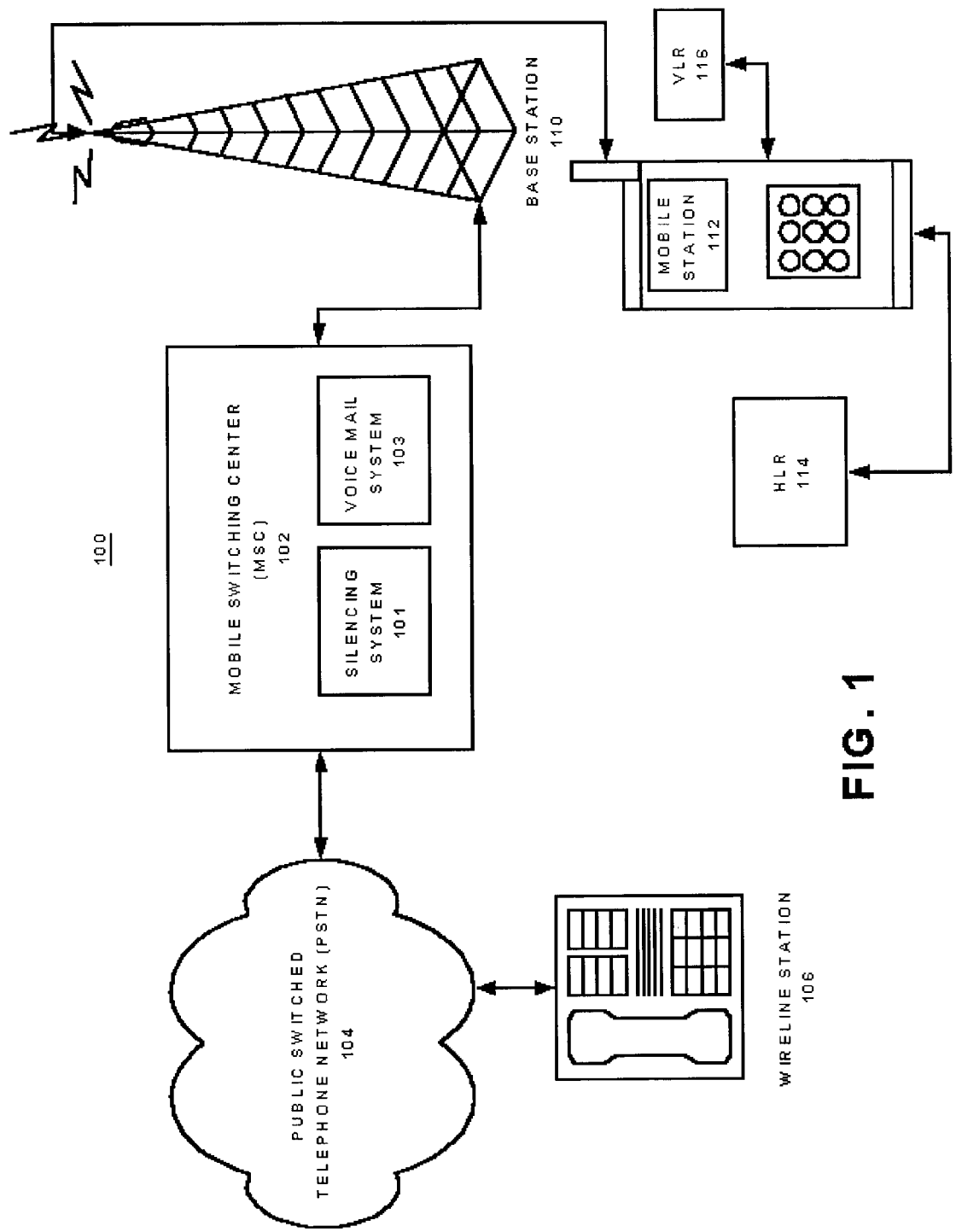
FIG. 1 depicts a block diagram illustrative of a mobile switching center, base station and mobile station for use with the present method and system.

Referring to FIG. 1, a system 100 is depicted for automatic/timed silencing of mobile handsets (also referred to as mobile phones). System 100 has a mobile switching center (MSC) 102. The system may be, or may be part of, one or more of a telephone network, a local area network ("LAN"), the Internet, and a wireless network. In the depicted embodiment, a public switched telephone network (PSTN) 104 is connected to MSC 102. The PSTN 104 routes calls to and from mobile users through the MSC 102. The PSTN 104 also routes calls from and to wireline stations 106. The MSC 102 is also connected to one or more base stations (BS) 110. Each of the base stations 110 communicates with mobile station(s) 112 in its service area. The PSTN 104 generally can be implemented as the worldwide voice telephone network accessible to all those with telephones and access privileges (e.g., AT&T long distance network).

Each of the mobile stations 112 has a home location register (HLR) 114 where data about each of the mobile stations 112 resides. Some of the mobile stations 112 may be remotely located from their home location, and in that case, a visiting location register (VLR) 116 is set up locally for each mobile station 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 can be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, can be implemented as a local database maintained by the cellular provider whose territory is being roamed. Mobile station 112 can be implemented as a cellular device, personal communication device, short message service device or wireless communications device (e.g., a wireless personal digital assistant).

The MSC 102 may have, or be operatively connected to, a silencing system 101 that provides for automatic/timed silencing of a mobile phone, such as mobile station 112. The MSC 102 may also have, or be operatively connected to, a voice mail system 103 as is known in the art.

Figure 2:
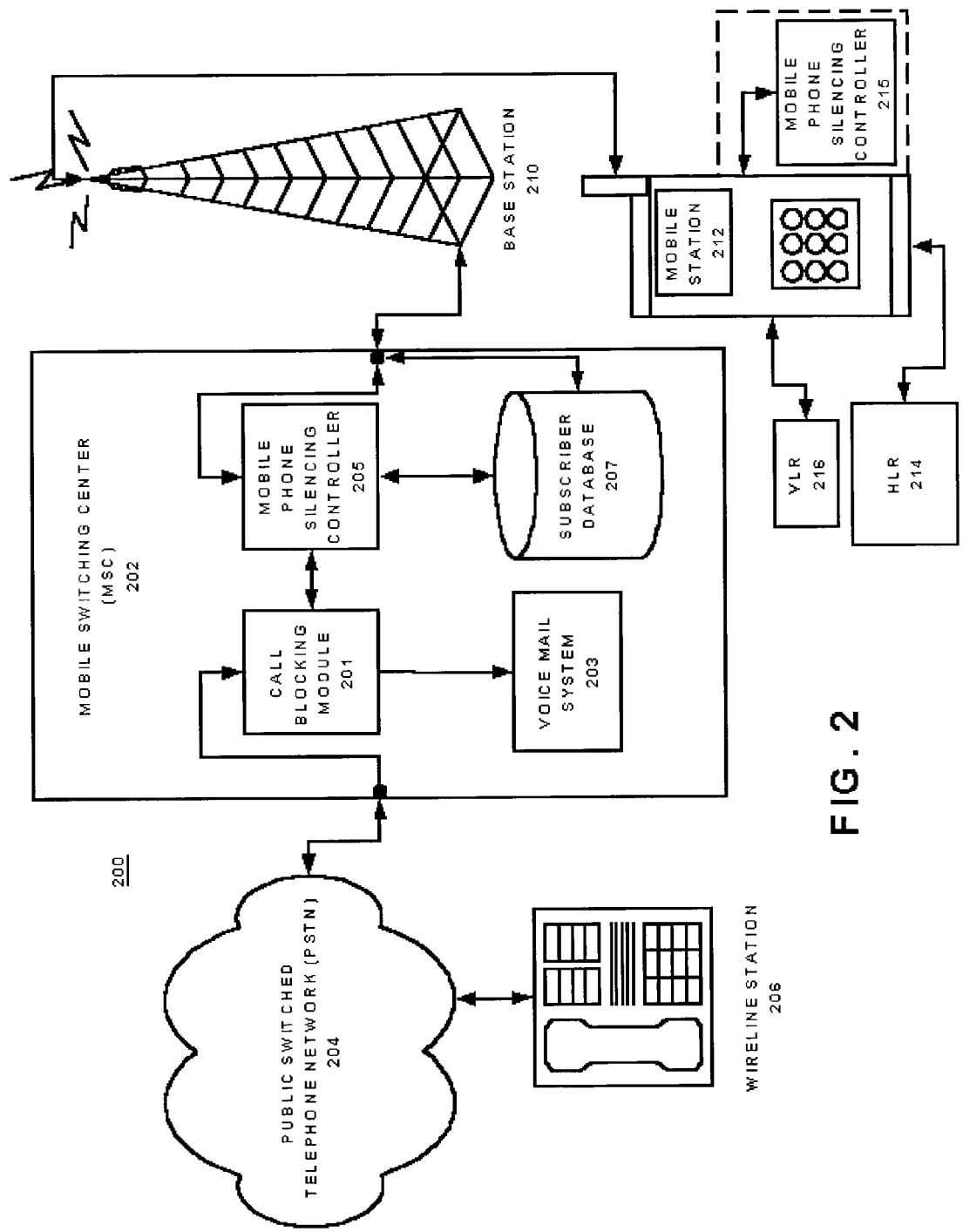
FIG. 2 illustrates a more detailed block diagram illustrative of a mobile switching center, base station, and mobile station according to one embodiment of the present method and system.

Referring to FIG. 2, a system 200 is shown for automatic/timed silencing of a mobile phone. FIG. 2 depicts a block diagram that is illustrative of a mobile switching center 202 operatively connected a PSTN 204, base station 210, and mobile station 212 according to one embodiment of the present method and system. The PSTN 204 routes calls to and from mobile users through the MSC 202, as well as routing calls from and to wireline stations 206. The MSC 202 is connected to one or more base stations 210. The base station(s) 210 communicates through the air to mobile stations 212, which may be of a cellular telephone type or of the wider bandwidth personal communication device type. Mobile stations 212 may be wireless handsets or automobile mounted stations the same as those shown in FIG. 1.

The MSC 202 may have a call blocking module 201 that prevents incoming calls from the PSTN 204 from reaching the mobile station 212. The call blocking module 201 may be operatively connected to a voice mail system 203 to which incoming calls may be diverted. The voice mail system 203 may operate in a known manner for storing messages related to the mobile station 212. The call blocking module 201 may also block other communications, such as message alerts, destined for the mobile station 212.

The mobile switching center 202 may have a mobile phone silencing controller 205 that is operatively connected to the call blocking module 201 and to a subscriber database 207 that stores data related to the mobile station 212. The mobile station 212 may have a mobile phone silencing controller 215 that communicates with the mobile phone silencing controller 205 in the mobile switching center 202.

A schedule of silence is formed by the mobile phone silencing controller 215 in the mobile phone 212. In general, one embodiment of forming a schedule of silence at a mobile phone consists of selecting a start time and an end time for the at least one period of time. The schedule of silence is transmitted from the mobile phone 212 to the mobile switching center 202 where the schedule of silence is stored in the subscriber database 207.

The schedule of silence may include at least one of a date, a day of a week, and a time period during a day. Furthermore the schedule of silence may include periodic time periods of mobile phone silence.

The call blocking module 201 operates by checking the HLR 214 or VLR 216 of the called party to determine whether the called party's telephone 212 is in the silent mode; if silent mode is active, the incoming call is routed to the voice mail system 203; if silent mode is not active, the call is routed to the mobile phone in the normal way.

The MSC mobile phone silencing controller 205 operates by sending a control message to the mobile station mobile phone silencing controller 215, which then temporarily disables the audible and alerting devices on the phone and displays a message such as "SILENT MODE" on the telephone display during the schedule of silence.

FIG. 3 is a block diagram depicting an embodiment of the present method. In very general terms the method has the steps of: storing a schedule of silence for a mobile phone in a telecommunication network (step 300); and effecting by the telecommunication network an automatic entering into a silence mode and exiting from the silence mode of the mobile phone according to the stored schedule of silence (step 302).

FIG. 4 is a block diagram depicting another embodiment of the present method. This embodiment of the method in a telecommunications network has the steps of: forming a schedule of silence at a mobile phone, the schedule of silence having at least one period during which the mobile phone is in a silent mode (step 400); sending the schedule of silence from the mobile phone to a mobile switching center (step 402); storing the schedule of silence in a subscriber database in the mobile switching center (step 404); blocking, by the mobile switching center, at least incoming calls at the mobile switching center for the mobile phone during the at least one period of the schedule of silence stored in the subscriber data base, and sending a first message to the mobile phone that instructs the mobile phone to enter a silence mode (step 406); entering, in response to the first message, the mobile phone into the silence mode (step 410); transmitting, at an end of the at least one period of the schedule of silence a second message from the mobile switching center to the mobile phone that instructs the mobile phone to exit the silence mode, and ceasing to block at least the incoming calls to the mobile phone (step 412); and exiting, in response to the second message, the mobile phone from the silence mode (step 414);.

Figure 5:
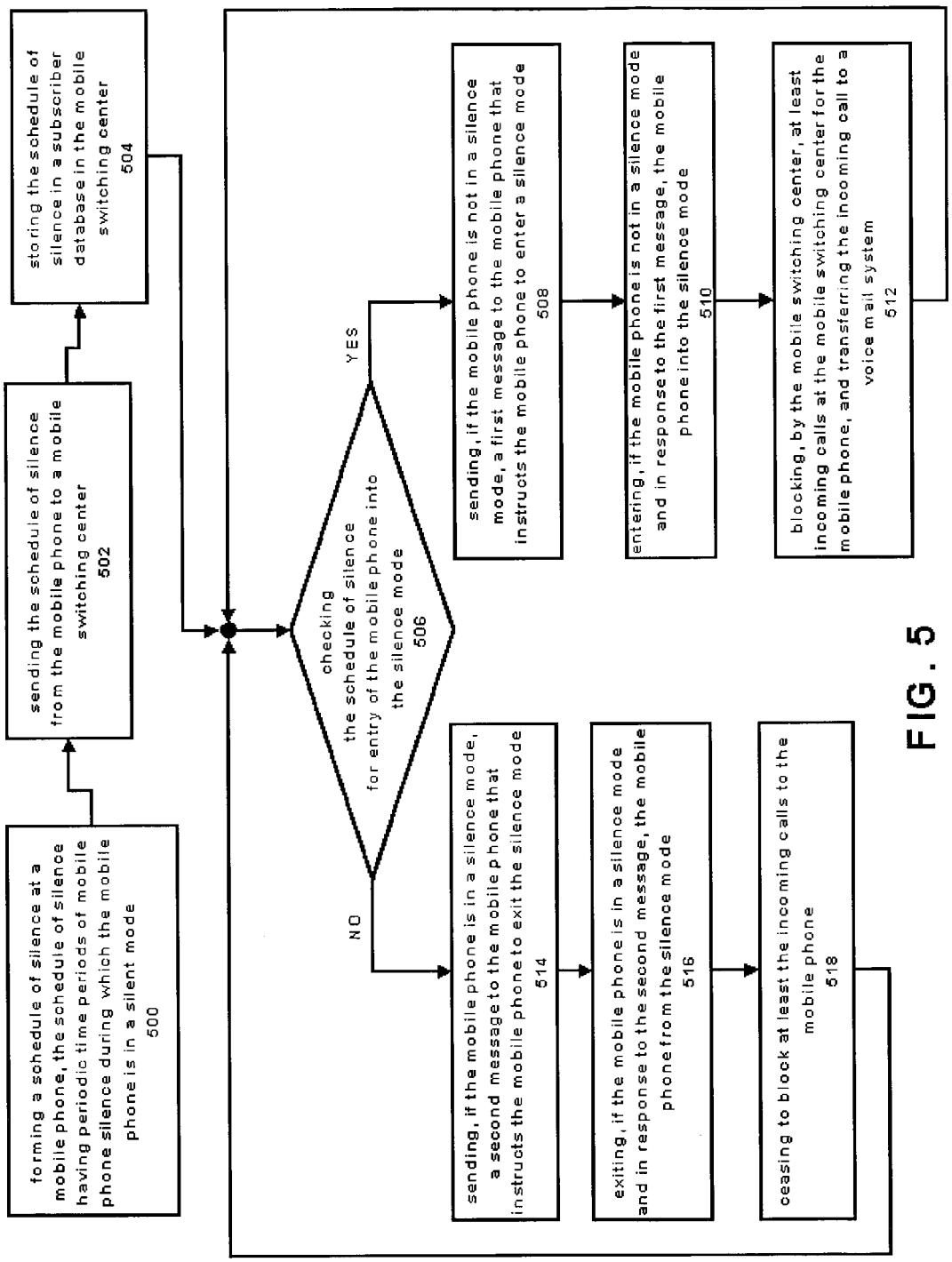
FIG. 5 illustrates yet a further flow chart of logical operational steps that may be followed in accordance with one embodiment of the present method and system.

FIG. 5 is a block diagram depicting yet another embodiment of the present method. In this embodiment of the method for providing automatic/timed silencing of a mobile phone by a telecommunications network, the method has the steps of: forming a schedule of silence at a mobile phone, the schedule of silence having periodic time periods of mobile phone silence during which the mobile phone is in a silent mode (step 500); sending the schedule of silence from the mobile phone to a mobile switching center (step 502); storing the schedule of silence in a subscriber database in the mobile switching center (step 504); checking the schedule of silence for entry of the mobile phone into the silence mode (step 506); sending, if the mobile phone is not in a silence mode, a first message to the mobile phone that instructs the mobile phone to enter a silence mode (step 508); entering, if the mobile phone is not in a silence mode and in response to the first message, the mobile phone into the silence mode (step 510); blocking, by the mobile switching center, at least incoming calls at the mobile switching center for the mobile phone, and transferring the incoming call to a voice mail system (step 512); sending, if the mobile phone is in a silence mode, a second message to the mobile phone that instructs the mobile phone to exit the silence mode (step 514); exiting, if the mobile phone is in a silence mode and in response to the second message, the mobile phone from the silence mode (step 516); and ceasing to block at least the incoming calls to the mobile phone (518).

The present system and method may be used with non-mobile phones, as well as, mobile phones. Also, different types of data storage devices may be used with the present method and system. For example, a data storage device may be one or more of a magnetic, electrical, optical, biological, and atomic data storage medium. The present invention overcomes the drawbacks of the prior art and provides an improved method and system in a telecommunications network for automatic/timed silencing of a mobile phone by the telecommunications network.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art. For example, the mobile phone silencing controllers in the mobile station and in the mobile switching center may be implemented in software. The call blocking module may also be implemented in software.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for providing automatic and timed silencing of a mobile phone by a telecommunications network, said method comprising the steps of:

storing a schedule of silence for a mobile phone in a telecommunication network; and effecting by the telecommunication network an automatic entering into a silence mode and exiting from the silence mode of the mobile phone according to the stored schedule of silence;

wherein a mobile switching center in the telecommunication network blocks all message alerts for the mobile phone and at least incoming calls at the mobile switching center for the mobile phone during at least one period of the schedule of silence, and wherein the mobile switching center sends a control message to temporarily disable audible and alerting devices on the mobile phone during the schedule of silence, and wherein the mobile phone displays a message to denote the silence mode during the schedule of silence.

2. The method of claim 1 further comprising the step of forming the schedule of silence at the mobile phone, the schedule of silence having at least one period during which the mobile phone is in the silent mode.

3. The method of claim 1 further comprising the step of storing the schedule of silence in a subscriber database in a mobile switching center in the telecommunication network.

4. The method of claim 1 further comprising the step of transferring the incoming call to a voice mail system.

5. The method of claim 1 further comprising automatically cycling the mobile phone into and out of the silence mode according to the schedule of silence.

6. The method of claim 1 wherein the silence mode of the mobile phone comprises no audio output, no visual output, and no vibration output.

7. A method far providing automatic and timed silencing of a mobile phone by a telecommunications network, said method comprising the steps of:

forming a schedule of silence at a mobile phone, the schedule of silence having at least one period during which the mobile phone is in a silent mode;

sending the schedule of silence from the mobile phone to a mobile switching center;

storing the schedule of silence in a subscriber database in the mobile switching center;

blocking, by the mobile switching center, all message alerts for the mobile phone and at least incoming calls at the mobile switching center for the mobile phone during the at least one period of the schedule of silence stored in the subscriber data base, and sending a control message to the mobile phone that instructs the mobile phone to enter a silence mode, wherein the mobile switching center sends the control message to temporarily disable audible and alerting devices on the mobile phone during the schedule of silence;

entering, in response to the control message, the mobile phone into the silence mode, wherein the mobile phone displays a message to denote the silence mode during the schedule of silence;

transmitting, at an end of the at least one period of the schedule of silence a second message from the mobile switching center to the mobile phone that instructs the mobile phone to exit the silence mode, and ceasing to block all message alerts for the mobile phone and at least the incoming calls to the mobile phone; and exiting, in response to the second message, the mobile phone from the silence mode.

8. The method of claim 7 wherein the schedule of silence includes at least one of a date, a day of a week, and a time period during a day.

9. The method of claim 7 wherein the schedule of silence includes periodic time periods of mobile phone silence.

10. The method of claim 7 wherein the silence mode of the mobile phone comprises no audio output, no visual output, and no vibration output.

11. The method of claim 7 further comprising the step of transferring the incoming call to a voice mail system.

12. The method of claim 7 further comprising in the step of forming a schedule of silence at a mobile phone selecting a start time and an end time for the at least one period.

13. A system for providing automatic and timed silencing of a mobile phone by a telecommunications network, said system comprising:

a schedule of silence for a mobile phone;

a mobile switching center operatively connected to the mobile phone;

a subscriber database operatively connected to the mobile switching center and having stored therein the schedule of silence for the mobile;

a call blocking module operatively connected to the mobile switching center; and a mobile phone silencing controller operatively connected to the mobile switching center and to the call blocking module;

wherein the mobile phone silencing controller automatically sends a control message to temporarily disable audible and alerting devices on the mobile phone and enters the mobile phone into a silence mode during the schedule of silence and exits from the silence mode according to the stored schedule of silence, and wherein the call blocking module blocks at least incoming calls for the mobile phone according to the stored schedule of silence, and wherein the mobile switching center blocks all message alerts for the mobile phone during the at least one period of the schedule of silence stored in the subscriber data base, and wherein the mobile phone displays a message to denote the silence mode during the schedule of silence.

14. The system of claim 13 wherein the system further comprises a mobile phone silencing module in the mobile phone, the mobile phone silencing module operatively connected to the mobile phone silencing module in the mobile switching center for forming the schedule of silence in the mobile phone and transferring the schedule of silence from the mobile phone to the mobile switching center.

15. The system of claim 13 wherein the schedule of silence includes periodic time periods of mobile phone silence.

16. The system of claim 13 wherein the silence mode of the mobile phone comprises no audio output, no visual output, and no vibration output.

17. The system of claim 13 further comprising a voice mail system that incoming calls for the mobile phone are transferred to when the mobile phone is in the silence mode.

* * * * *